Feb. 19, 1929.
R. C. SHAND
1,702,919
HOSE RACK
Filed Feb. 4, 1926
2 Sheets-Sheet 1
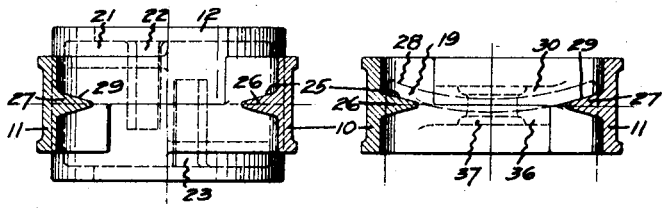
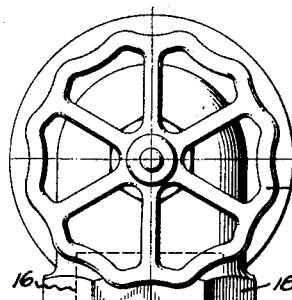
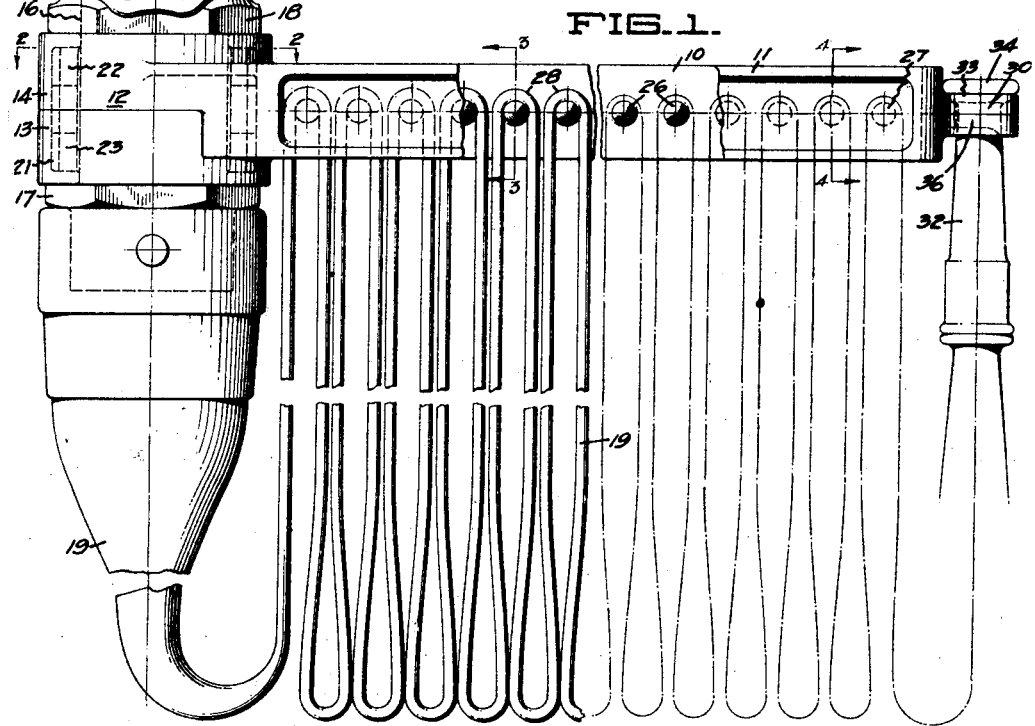
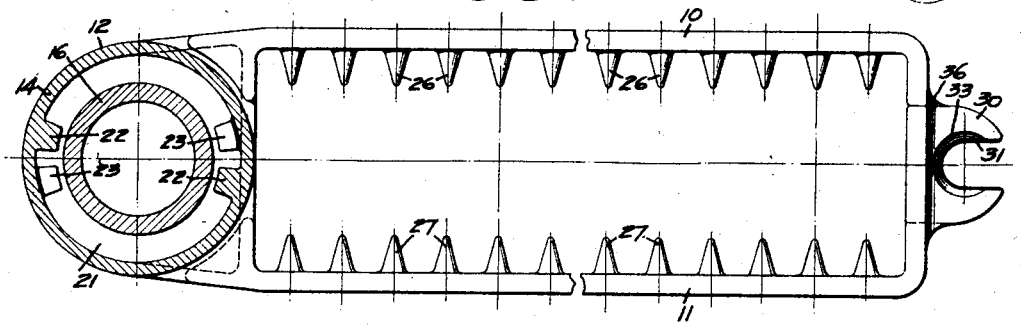
INVENTOR
Reginald C. Shand
BY
White First
his ATTORNEYS Feb. 19, 1929.
R. C. SHAND
1,702,919
HOSE RACK
Filed Feb. 4, 1926 2 Sheets-Sheet 2
FIG_5_
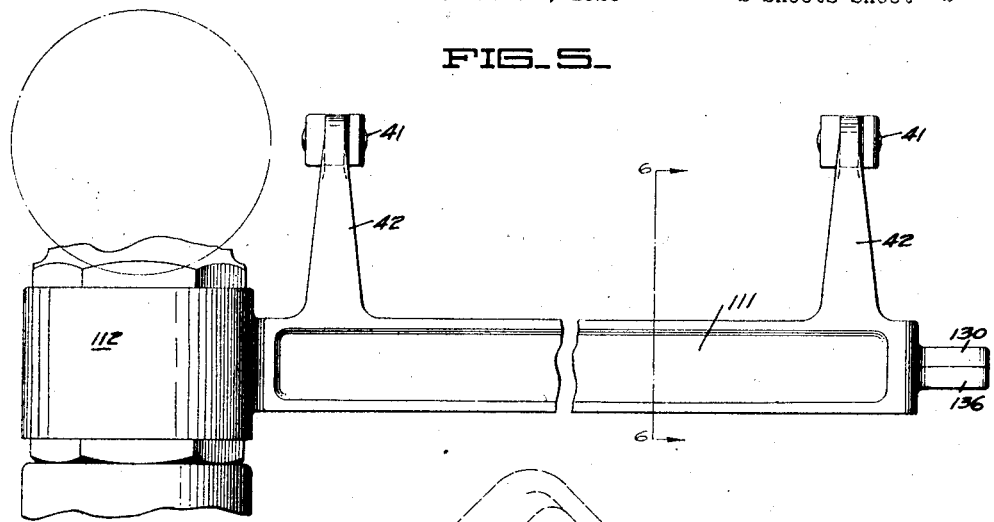
FIG_6_
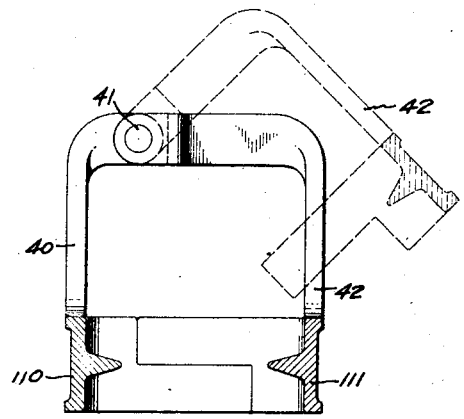
INVENTOR
Reginald C. Shand.
BY
his ATTORNEYS Patented Feb. 19, 1929.

1,702,919

UNITED STATES PATENT OFFICE.

REGINALD C. SHAND, OF PIEDMONT, CALIFORNIA, ASSIGNOR, BY MESNE ASSIGNMENTS, TO SHAND & JURS COMPANY, OF BERKELEY, CALIFORNIA, A COPARTNERSHIP COMPOSED OF REGINALD C. SHAND AND ALBERT E. JURS.

HOSE RACK.

Application filed February 4, 1926. Serial No. 85,818.

This invention relates generally to supports and particularly to a rack for supporting a fire hose.

It is an object of this invention to devise a rack which supports a length of folded hose in such a manner that it may be easily and quickly removed by an operator.

It is a further object of this invention to devise a rack which will support the hose in such a manner as to avoid injuring the same.

It is a further object of this invention to devise a hose rack in which the operator need not disengage a special locking device before removing the hose. It is proposed to employ the nozzle of the hose as a means for maintaining the rack in locked position so that upon the removal of the nozzle by an operator the hose is at once disengaged.

It is a further object of this invention to support a hose by means of two separable side bars, each of which is provided with a plurality of studs which are adapted to engage and support the separate loops of the folded hose. To disengage the hose these side bars need only be separated so that the hose is allowed to drop clear of the rack.

It is a further object of this invention to devise a hose rack of simple construction, which will have a minimum number of parts and will be cheap to manufacture.

Further objects of the invention will appear from the following description in which I have set forth the preferred embodiments of my invention. It is to be understood that the scope of the invention is only to be limited as defined by the appended claims.

Referring to the drawings:

Figure 1 is a side view of one embodiment of the invention showing the manner in which it is employed to support a folded hose.

Fig. 2 is a cross sectional view taken along the line 2—2 of Fig. 1.

Fig. 3 is a transverse cross sectional view taken along the line 3—3 of Fig. 1.

Fig. 4 is a transverse sectional view taken along the line 4—4 of Fig. 1.

Fig. 5 is a side elevation of a modification of the invention.

Fig. 6 is a transverse sectional view taken along the line 6—6 of Fig. 5.

The invention comprises generally a pair of side bars 10 and 11 which are mounted so as to be relatively movable with respect to each other. For the sake of simplicity it is preferable to provide for this relative movement by pivotally connecting the side bars together and thus as shown in Figs. 1 to 4 inclusive, the bars 10 and 11 have a pivotal connection 12 which in this case also serves as a support for the bars. This pivotal connection 12 preferably comprises a pair of collars 13 and 14 to which the bars 10 and 11 are respectively secured and which collars are secured to the water pipe fitting 16 between the flanges 17 and 18. The lower end of the pipe 16 is suitably coupled to the folded hose 19 while the upper end communicates with a valve 20 which controls the supply of water to the hose. To limit the pivotal movement and prevent sagging of the bars the collars are each recessed as at 21 to receive the depending lugs 22 secured to the collar 14 which engage with the upstanding lugs 23 secured to the collar 13.

In order to provide means for engaging the folded hose when the side bars 10 and 11 are in their closed position at least one of these bars is provided with a plurality of inwardly extending lugs or studs which are adapted to engage the upper ends of the separate loops of the folded hose. Thus the bar 10 is provided with a plurality of spaced studs or lugs 26 and the bar 11 is provided with similar lugs 27 which are alined with the lugs 26. These lugs are adapted to engage and support the ends of the separate loops 28 of the folded hose 19 in the manner shown in Figs. 1 and 4. In order to facilitate the disengagement of the hose from the lugs 26 and 27 the upper surfaces 25 and 29 of the lugs are preferably sloped downwardly so that the folded hose will have a tendency to force the side bars apart. This force is normally sufficient to separate the released side bars and to disengage the lugs 26 and 27 from the hose so that in use it is only necessary for the operator to unlock the side bars to permit the folded hose to fall free of the rack. It is also preferable to employ tapered lugs as shown in Figs. 3 and 4 so that in case the pivotal connection between the bars offers too much friction to allow them to be automatically separated an additional force exerted by the operator upon the hose will cause the bars to separate to disengage the same.

While it is possible to employ any suitable type of locking means for retaining the bars 10 and 11 in closed position it is preferable to employ a locking device which will be automatically released upon removal of the hose nozzle from the rack. Thus at least one of the side bars, say the bar 11, is provided with an extension 30 which is slotted as at 31 to receive and support the hose nozzle 32. The upper face of the extension 30 is preferably provided with a recess 33 in order to more securely retain the end 34 of the nozzle 32 within the slot 31. The bar 10 is likewise provided with an extension 36 which is adapted to underlie the extension 30 when the bars 10 and 11 are in closed position. The extension 36 may also be provided with a slot 37 which is adapted to register with the slot 31 in the extension 30 so that when the nozzle 32 is being supported in the slot 31 of the extension 30 the extensions 30 and 36 and therefore the side bars 10 and 11 will be locked in closed position as shown in Fig. 1. To release this locking device it is only necessary for the operator to remove the nozzle 32. Since as previously explained, the lugs 26 and 27 are constructed in such a manner that the weight of the hose automatically causes the side bars to be moved apart when released, it will be seen that a device has been provided in which the hose will be automatically dropped clear of the rack merely upon removal of the nozzle by an operator.

In Figs. 5 and 6 a modification of the invention is shown in which the side bars are pivotally connected together upon a horizontal axis rather than on a vertical axis shown in Figs. 1 to 4 inclusive. In this case the bar 110 is supported in horizontal position by suitable means such as a collar 112 and is provided with suitable arms 40 which are pivotally connected as at 41 with arms 42 extending from the other side bar 111. With this construction the bar 111 may swing outwardly as shown in the dotted line construction of Fig. 6 so as to allow the folded hose to be disengaged. The locking device in this case is the same as that previously described and comprises slotted extensions 130 and 136 adapted to receive the nozzle of the hose.

The operation of the device will be obvious from the above description. To engage the folded hose it is only necessary to position the upper looped ends of the hose upon the lugs 26 and 27 either before or after positioning the nozzle 32 upon the extensions 30 and 36. To disengage the hose it is only necessary for the operator to remove the nozzle 32 upon which the side bars automatically move outwardly to allow the folded hose to drop free of the rack. Since the separate loops of the folded hose are each supported from two points of suspension it will be clear that this form of rack will not injure the hose as with devices in which the hose is clamped between two bars.

As the device consists of only two separate parts it is very cheap to manufacture and may be readily installed in a building. With the construction of Figs. 1–4 the two parts may be made identical as shown.

I claim:

1. A hose rack comprising a pair of side bars pivotally connected together, the axis of said pivotal connection being substantially parallel to said bars, means projecting from the inner faces of said bars to engage the loops of a folded hose, and means for locking said bars in fixed spaced relationship.

2. A hose rack comprising a pair of side bars pivotally connected together, the axis of said pivotal connection being substantially parallel to said bars, means projecting from the inner faces of said bars to engage the loops of a folded hose, and combined means for supporting the nozzle of the hose and for locking said bars in fixed relationship to support said hose.

In testimony whereof, I have hereunto set my hand.

REGINALD C. SHAND.